United States Patent [19]

Gasper

[11] 4,233,265
[45] Nov. 11, 1980

[54] LIQUID POLYMER HYDRATION

[75] Inventor: Kenneth E. Gasper, Overland Park, Kans.

[73] Assignee: Olin Corporation, New Haven, Conn.

[21] Appl. No.: 60,558

[22] Filed: Jul. 25, 1979

Related U.S. Application Data

[62] Division of Ser. No. 961,310, Nov. 16, 1978, Pat. No. 4,201,867.

[51] Int. Cl.³ .......................... B01F 5/00; B01F 15/02
[52] U.S. Cl. ................................. 422/135; 422/190;
422/224; 422/241; 366/132; 366/160; 366/177;
366/341; 252/359 D
[58] Field of Search ............... 422/135, 190, 224, 240,
422/241, 243; 366/132, 160, 177, 341, 76, 77,
91, 96; 252/359 A, 359 D, 359 E

[56] References Cited

U.S. PATENT DOCUMENTS

| | | | |
|---|---|---|---|
| 3,807,701 | 4/1974 | Reid et al. | 366/132 |
| 4,051,065 | 9/1977 | Venema | 252/359 A |
| 4,143,115 | 3/1979 | Ward et al. | 422/224 |

*Primary Examiner*—Bradley R. Garris
*Attorney, Agent, or Firm*—William A. Simons; Thomas P. O'Day

[57] ABSTRACT

Described is a mixing apparatus and its use in the hydration of liquid polymers. The apparatus includes two packed mixing columns, each having two reducing couplings attached thereto to form an inlet and an outlet to each column. The outlet of the first mixing column is connected to the inlet of the second mixing column via means of a reducing passageway. The apparatus also has sources of supply for liquid polymer and water connected to the inlet of the first mixing column through metering means and injection check means. The apparatus provides controlled mixing velocity during the hydration with non-shearing agitation and without a chemical buildup.

4 Claims, 1 Drawing Figure

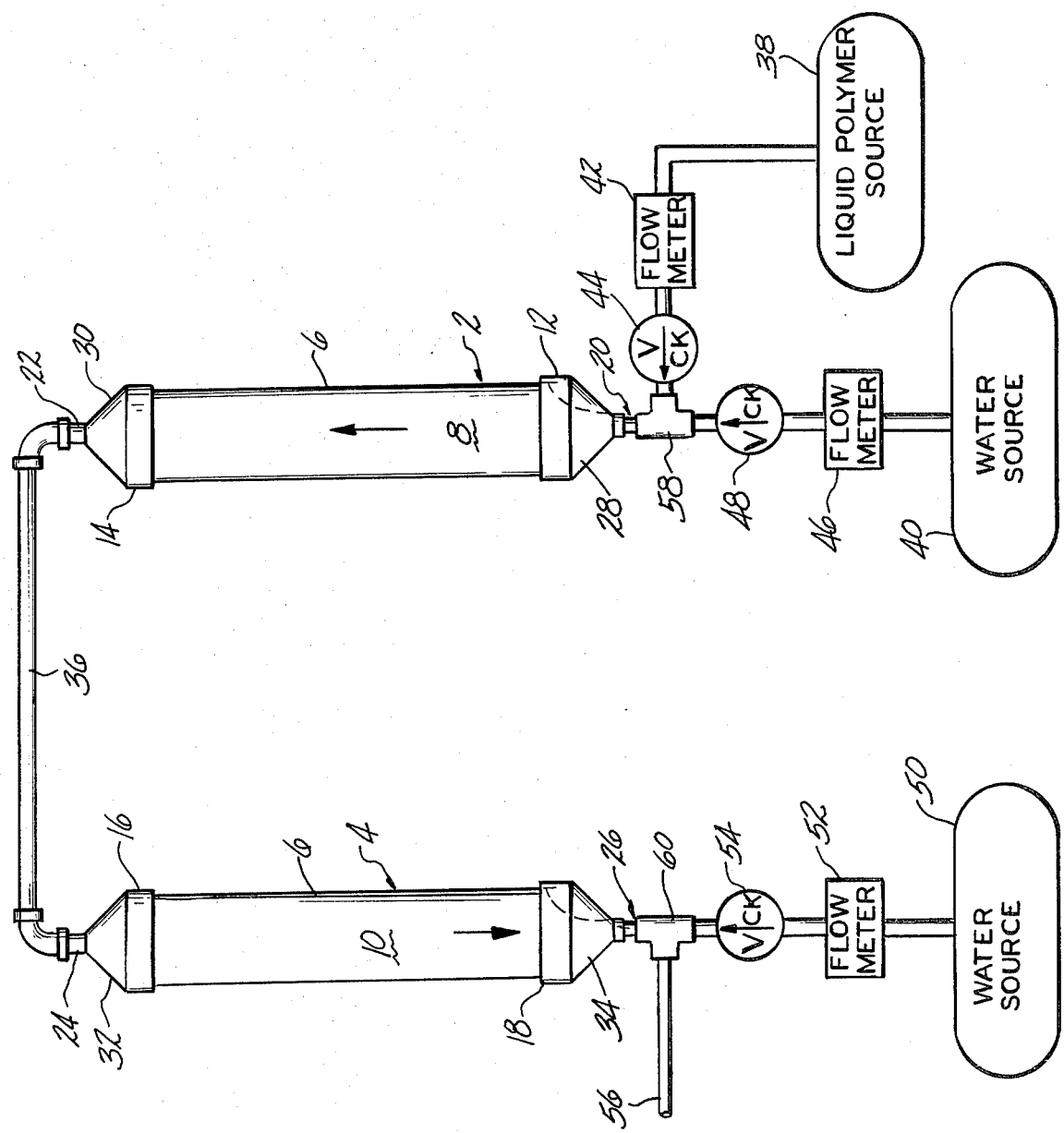

LIQUID POLYMER HYDRATION

This is a division of application Ser. No. 961,310, filed Nov. 16, 1978, now U.S. Pat. No. 4,201,867.

BACKGROUND OF THE INVENTION

A. Field of the Invention

This invention relates to the hydration of liquid polymers and, more particularly, to a novel apparatus and its use in the hydration of liquid polymers.

B. Description of the Prior Art

Liquid polymers are increasingly used as flocculating agents in many water and waste treatment installations. For example, liquid polymers may be used in water treatments such as raw water clarification, municipal and industrial waste water clarification, chemical process water purification and emulsion breaking.

For such uses, it is usually necessary that the commercially-available, concentrated liquid polymer solutions and dispersions be first hydrated to form a dilute aqueous solution having less than about 1.09% by weight liquid polymer present. However, much care is normally necessary for such hydration. In particular, the mixing time and relative amounts is usually closely controlled to avoid the formation of a water-insoluble gelatinous mass of polymer which can lead to a waste of chemical and clogged process lines. Furthermore, the velocity during hydration is also normally controlled so as to not cause agitation that may shear apart the polymer chains and thereby reduce the effectiveness of the polymer.

In general, proposed prior art methods of hydrating liquid polymers include "in-line" mixers which make use of helix configurations inside a section of pipe. See, for example, Kenics Corporation sales brochure entitled "STATIC MIXER MODULES—DESIGN BULLETIN" effective Mar. 1, 1974; Kenics Corporation technical report entitled "OPERATION OF STATIC MIXER UNITS", 1976; and Komax Systems, Inc., sales brochure entitled "PROCESS CONTROL MOTIONLESS MIXING" Bulletin 103, effective September, 1976. However, such designs may not provide the close control of polymer hydration that is needed to prevent the problems of insoluble mass formation and polymer shearing. Batch-type mixers have also been proposed for hydrating liquid polymers. However, such apparatus requires large tanks and careful addition of the polymer to the water in order to prevent the formation of insoluble gelatinous masses.

BRIEF SUMMARY OF THE INVENTION

The present invention, therefore, is directed toward an apparatus and a method for hydrating liquid polymers. The apparatus includes two packed mixing columns, each having two reducing couplings attached thereto to form an inlet and outlet to each column. The outlet of the first mixing column is connected to the inlet of the second mixing column via means of a reducing passageway. The apparatus also has sources of supply for liquid polymer and water connected to the inlet of the first mixing column through metering means and injection check means.

The present method for hydrating liquid polymers includes feeding the liquid polymer and water into the above-defined apparatus in a water:polymer weight ratio of at least about 100:1; controlling the velocity of the resulting mixture within the mixing apparatus and providing a sufficient residence time of the mixture within the apparatus so that a homogeneous mixture free of insoluble masses is withdrawn from the apparatus.

BRIEF DESCRIPTION OF THE DRAWING

The FIGURE illustrates a preferred embodiment of the present invention.

DETAILED DESCRIPTION

Referring to the FIGURE, the packed mixing columns 2 and 4 are preferably made of oxidizing agent-inert plastic material and have walls 6 which define confined spaces 8 and 10, respectively, for fluid flow in an overall mean flow direction approximately parallel to the columns walls. Among these plastic materials are the synthetic materials which are inert to oxidizing agent attack and which may be solvent welded. Particularly useful are the high polymer resins and plastics such as polyvinyl chloride (PVC) and the like. However, the choice of material is not critical to the present invention and it is well within the knowledge of one of ordinary skill in the art to select a suitable material which is commercially available.

The walls 6 of the mixing columns may be of any geometry desired as long as no pockets or corners are created in the direction of overall flow of fluid in the columns which may creat detrimental chemical buildup. For example, the walls 6 may have a rectangular cross-section or a circular cross-section or any other configuration subject to the preceding proviso. A particularly advantageous geometry for these walls is a simple circularly cross-section, i.e., the walls are tubular.

An important aspect of the geometry of the mixing columns 2 and 4 involves the avoidance of problematic pockets and increased mixing capabilities by employing reducing couplings 12, 14, 16, and 18 at each end of the two mixing columns to form an inlet 20 and an outlet 22 for mixing column 2 and inlet 24 and outlet 26 for mixing column 4. These four couplings may also be made of plastic materials such as polyvinyl chloride (PVC) and may be advantageously solvent welded to the column walls. By solvent welding, the need for flanges and bolts is eliminated and the likelihood of leakage during use is thereby substantially reduced. Additionally, couplings 12, 14, 16, and 18 have inwardly tapering surfaces 28, 30, 32, and 34, respectively, which reduced the cross sectional area of the confined spaces 8 and 10. Surfaces 28, 30, 32, and 34 form angles of at least 110°, and preferably at least 125°, with wall 6 as shown by the dotted lines in the FIGURE. The formation of angles this size, or greater, between the column wall 6 and the reducing surfaces 28, 30, 32, and 34 assures that no pocket areas are created near the inlets 20 and 24 and the outlets 22 and 26 of the two mixing columns, respectively.

The outlet 22 of mixing column 2 is connected to inlet 24 of mixing column 4 by means of a reducing passageway number 36. This reducing passageway 36 provides a rapid velocity change for the aqueous solution to enhance mixing. The length of this reducing passageway is not critical to the present invention. However, it should be of sufficient length to provide a cross-over manifold between the two mixing columns. The ratio of the average cross-sectional areas of the mixing columns, i.e., between walls 6, to that of the reducing passage should be about 4:1 to about 20:1, preferably about 6:1 to about 15:1. The reducing passageway, like the mixing columns, may be constructed of any suitable material, preferably PVC. The reducing passageway 36 may be attached to the reducing couplings 14 and 16 by any desired means, including threaded joints or by solvent welding.

Mixing columns 2 and 4 contain packing material (not shown in the FIGURE) to increase the mixing of the liquid polymer and water in the columns. The preferred types of the packing material include ceramic saddles and rings. However, it should be noted that it would be within the ordinary skill of one in this art to determine optimum type and size of packing material for each operation. Accordingly, the present invention is not intended to be limited to any particular type or size of packing material.

In the apparatus of the present invention, the inlet 20 of the first mixing column 2 is connected to sources of liquid polymer and water via separate metering means and check valve. The usual source of the liquid polymer is commercial drums or bulk storage tanks filled with the desired polymer. The usual source of water is either the plant or municipal water supply. Preferably, it is desirable to employ fresh water rather than waste or process water. The metering means may be any conventional structure or deisgn for motivating each starting material at predetermined amounts or rates of flow from its source to the inlet of the first mixing column. In the case of the liquid polymer, the preferred metering means is a positive displacement pump. A simple rotameter is preferred for metering water. However, the metering means may instead by any other conventional gas, electric or gravity type flow regulated pumping system. The check valves serve to prevent back flow of the two starting materials into the feed lines. Preferably, any conventional injection check valve can be employed for the liquid polymer. Ball-type check valves are preferred for the water.

Thus, by reference to the FIGURE, liquid polymer source 38 is connected to metering means 42 which is connected to injection check valve 44, the latter being in turn connected through mixing tee 58 to the inlet 20 of the first mixing column 2; and water source 40 is connected to metering means 46 which is connected to injection check valve 48, which in turn is also connected through mixing tee 58 to inlet 20.

In a preferred embodiment, additional water source 50 is connected at or after outlet 26 of second mixing column 4 via conventional metering means 52, check valve 54, and mixing tee 60. This additional water source is preferably used to further dilute the hydrated liquid polymer to optimum concentration. Line 56 which is connected to outlet 26, takes the hydrated liquid polymer to the desired water or waste treatment facilities.

Preferably, the described apparatus of the prevent invention may be made modular in design to permit packaging for shipment. Accordingly, the entire apparatus can be bolted together on a metal or plastic mounting plate. The mounted assembly may then be in turn mounted on a plant wall or may be mounted on one or more posts or poles.

The apparatus of the present invention advantageously provides controlled velocity during hydration with concurrent non-shearing mixing in a geometric configuration that prevents chemical buildup during operation. Moreover, other advantages of the apparatus of this invention include a system that has no moving parts and the easy feeding of liquid polymer directly from a drum or bulk storage tank into the first mixing tank.

In an embodiment of the method of the present invention, the first step is having a liquid polymer and water separately fed from their sources to the inlet of a first packed mixing column via individual metering means and check valves. The weight ratio of water to liquid polymer being fed is greater than about 100:1, preferably in the range of about 150:1 to about 400:1.

Typical liquid polymers for the present invention include polyacrylamides, cationic-modified polyacrylamides, anionic-modified polyacrylamides, polyacrylates and polyquaternaryamides that are conventionally used in water treatment. These polymers usually are characterized as having a relatively high viscosity (e.g., from about 250 to greater than about 5,000 centipoise at 25° C.) and relatively high molecular weights (e.g., in the 200,000 to over 10 million range). Such unhydrated liquid polymers are commercially available in concentrated aqueous solutions or concentrated aqueous dispersions (i.e., concentrated aqueous solutions of liquid polymers also containing a hydrocarbon carrier such as xylene or the like). For purposes of this invention, an unhydrated liquid polymer that is to be hydrated according to the present invention is defined to mean polymer solutions as supplied commercially in neat or undilute form.

The next steps of the present invention are sequentially passing the mixture of liquid polymer and water through the first packed mixing column, then through the reducing passageway and through the second packed mixing column and finally withdrawing the hydrated polymer from the outlet of the second packed mixing column for later application at the desired water treatment facilities. It is important that the velocity of the mixture be controlled during the passage through the columns and reducing passgeway, otherwise, possible undesired shearing of the polymer may occur. Accordingly, it is desirable that velocity of the mixture in the two packed mixing columns be less than about 1.0 foot per second, more preferably, less than about 0.5 foot per second, and the velocity in the reducing passageway be less than about 7.0 feet per second, more preferably, less than about 3.5 feet per second. Furthermore, the retention time within this three-stage mixer should be sufficient to effect a homogeneous hydrated mixture free of insoluble masses. Usually, an overall retention time of about 30 seconds to about 300 seconds, more preferably, from about 60–120 seconds, is desirable to achieve this result.

After withdrawing the hydrated polymer from the mixing apparatus, it may be directly transferred to the desired water or waste treatment operation for use as a flocculating agent or the like.

In a preferred embodiment of the present method, the hydrated polymer may be further diluted with additional water so as to achieve the optimum concentration of polymer in the water for best flocculating results. Accordingly, it may be desirable, depending on the liquid polymer and the intended use, to dilute the hydrated polymer exiting the outlet of the second packed mixing column with from about 1 to about 10 times more water, more preferably, from about 2 to about 5 times more water.

The following example further illustrates the present invention. All parts and percentages are by weight unless otherwise indicated.

SPECIFIC EXAMPLE

The novel apparatus shown in the FIGURE was used as follows.

A large U.S. Southern petrochemical company required the use of a liquid polymer flocculating agent in a waste water treatment clarifier to settle suspended solids. An anionic polyacrylamide-type of polymer in a water-oil emulsion was selected for this use.

This polymer was fed into the apparatus illustrated by the FIGURE at a rate of about 25 to 30 gallons per day on a continuous feed basis via a positive displacement metering pump and a ball-type injection check value to the inlet mixing tee. Plant water was simultaneously fed to this mixing tee via a conventional ½-inch rotameter and check valve at the rate of about 3.5 to about 4.2 gallons per minute, also on continuous feed basis.

This mixture, after said mixing tee, passed vertically through a first packed mixing column of 4 inch diameter and 48 inch height, constructed of PVC and provided with inlet and outlet reducing couplings having anlges of at least 125° with the column walls as shown in the FIGURE. The mixing column was packed with 0.32 cubic feet of 1 inch Burl saddles.

After passing through this packed column, the liquid mixture passed through a reduced passageway of 0.75 inch nominal pipe size and about 18 inches of length. This passageway was also composed of PVC. The velocity of mixture through this reduced passageway was calculated to be about 2.1–2.5 feet per second.

Next, the mixture was passed through a second packing mixing column of the same geometry as the first column. This second column was also packed with 0.32 cubic feet of 1 inch Burl saddles. After a 60 second retention time, the hydrated liquid polymer exited the second mixing column in a homogeneous condition and free of insoluble masses. A further $H_2O$ dilution was provided through ¾-inch rotameter at a rate of 5 gallons per minute as indicated in the FIGURE, to further disperse the hydrated liquid polymer. This second dilution further increased the weight ratio of $H_2O$ to liquid polymer by a factor of at least 2:1. This hydrated liquid polymer performed satisfactorily for the purpose it was intended.

What is claimed is:

1. An apparatus for the hydration of liquid polymers comprising:
   (a) first and second packed mixing columns, said columns made of oxidizing agent-inert plastic material, and said columns having walls defining a confined space for fluid flow in an overall mean flow direction approximately parallel to said walls;
   (b) two reducing couplings for each of said columns, one of said couplings being located at one end of said column and attached to said walls to form an inlet and the other of said couplings being located at the other end of said column and attached to said walls of said column to form an outlet, said couplings having surfaces which reduce the cross-sectional area of said confined space defined by said column walls, said coupling surfaces forming an angle of at least 110° with said column walls;
   (c) said outlet of said first mixing column connected to said inlet of said second mixing column by means of a reducing passageway; the ratio of the average cross-sectional areas between said confined spaces defined by said column walls and said confined space defined by the reducing passageway walls is from about 4:1 to about 20:1,
   (d) a first check valve connected to said inlet of said first mixing column;
   (e) a liquid polymer source;
   (f) a metering means connecting said first check valve to liquid polymer source;
   (g) a second check valve connected to said inlet of said first mixing column;
   (h) a water source; and
   (i) a second metering means connecting said second check valve with said water source.

2. The apparatus of claim 1 wherein a second water source is connected to said outlet of said second packed mixing column.

3. The apparatus of claim 1 wherein said first and second packed mixing columns, said reducing couplings and said reducing passageway are all composed of polyvinyl chloride.

4. The apparatus of claim 1 wherein the packing for said first and second mixing columns is saddles.

* * * * *